United States Patent
Kiraly et al.

(10) Patent No.: US 9,286,719 B2
(45) Date of Patent: Mar. 15, 2016

(54) AUTOMATED DETECTION OF AIRWAY AND VESSEL ORIENTATIONS FOR QUANTITATIVE ANALYSIS AND VISUALIZATION

(75) Inventors: Atilla Peter Kiraly, Plainsboro, NJ (US); Carol L. Novak, Newtown, PA (US); Benjamin L. Odry, West New York, NJ (US)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 13/205,147

(22) Filed: Aug. 8, 2011

(65) Prior Publication Data

US 2012/0268450 A1 Oct. 25, 2012

Related U.S. Application Data

(60) Provisional application No. 61/387,680, filed on Sep. 29, 2010.

(51) Int. Cl.
*G06T 19/00* (2011.01)
*G06T 7/00* (2006.01)

(52) U.S. Cl.
CPC ............ *G06T 19/00* (2013.01); *G06T 7/0012* (2013.01); *G06T 2207/10081* (2013.01); *G06T 2207/30061* (2013.01); *G06T 2219/008* (2013.01)

(58) Field of Classification Search
CPC ......... G06T 19/00; G06T 17/20; G06T 17/00; A61B 5/0836; A61B 5/083; G01N 33/497
See application file for complete search history.

(56) References Cited

U.S. PATENT DOCUMENTS

| | | | | |
|---|---|---|---|---|
| 5,920,319 | A * | 7/1999 | Vining | A61B 5/1076 345/419 |
| 2004/0151356 | A1* | 8/2004 | Li et al. | 382/131 |
| 2005/0107679 | A1* | 5/2005 | Geiger et al. | 600/407 |
| 2007/0064988 | A1* | 3/2007 | Odry et al. | 382/128 |
| 2008/0101675 | A1* | 5/2008 | Guiliguian et al. | 382/131 |
| 2009/0185731 | A1* | 7/2009 | Ray et al. | 382/131 |
| 2009/0203996 | A1* | 8/2009 | Thiele et al. | 600/441 |
| 2009/0281418 | A1* | 11/2009 | Ruijters et al. | 600/424 |
| 2010/0217125 | A1* | 8/2010 | Kadokura et al. | 600/443 |
| 2010/0310146 | A1* | 12/2010 | Higgins et al. | 382/131 |
| 2012/0053477 | A1* | 3/2012 | Zhang | A61B 5/0422 600/515 |

OTHER PUBLICATIONS

Application of Three-Dimensional Airway Algorithms in a clinical Study, Masaharu Nishimura. Proc Am Thorac Soc vol. 5. pp. 910-914, 2008.*

B.L. Odry, A.P. Kiraly, C.L. Novak, D.P. Naidich, and J.F. Lerallut, "Automated airway evaluation system for multi-slice computed tomography using airway lumen diameter, airway wall thickness and broncho-arterial ratio," SPIE Medical Imaging 2006, vol. 6143. Feb. 2006.

(Continued)

*Primary Examiner* — Ryan R Yang
*Assistant Examiner* — Saptarshi Mazumder

(57) ABSTRACT

A method including displaying a three-dimensional (3D) image of a lung, receiving a selection of an airway of the lung and displaying a two-dimensional (2D) cross-section image of the airway perpendicular to the airway's long axis, wherein the display of the 2D cross-section image occurs almost immediately after the selection of the airway is received.

14 Claims, 6 Drawing Sheets

(56) References Cited

OTHER PUBLICATIONS

A.P. Kiraly, J.M. Reinhardt, E.A. Hoffman, G. McLennan, and W.E. Higgins, "Virtual Bronchoscopy for Quantitative Airway Analysis," SPIE Medical Imaging 2005: Physiology, Function, and Structure from Medical Images, A. Amini and A. Manduca, eds., SPIE Proceedings vol. 5746, Feb. 2005.

A.P. Kiraly and W.E. Higgins, "Three-dimensional path planning for virtual bronchoscopy," IEEE Trans. Med. Img., vol. 23, No. 11, pp. 1353-1364. Nov. 2004.

A.P. Kiraly, W.E. Higgins, G. McLennan, E.A. Hoffman, and J. Reinhardt, "3D human airway segmentation methods for clinical virtual bronchoscopy," Journal of Academic Radiology, vol. 9, No. 10, pp. 1153-1168, Oct. 2002.

* cited by examiner (a) (b) (c)

AUTOMATED DETECTION OF AIRWAY AND VESSEL ORIENTATIONS FOR QUANTITATIVE ANALYSIS AND VISUALIZATION

CROSS-REFERENCE TO RELATED APPLICATION

This application claims priority under 35 U.S.C. §119 to U.S. Provisional Application No. 61/387,680, filed Sep. 29, 2010, the disclosure of which is incorporated by reference herein in its entirety.

BACKGROUND OF THE INVENTION

1. Technical Field

The present invention relates to quantitative airway analyses using high-resolution images, and more particularly, to quantitative airway analyses using high-resolution images to estimate abnormalities related to airway dimensions.

2. Discussion of the Related Art

There is a growing interest in quantitative airway analyses using high-resolution Computed Tomography (CT) images to estimate abnormalities related to airway dimensions, including measurement of airway dilation or peribronchial thickening. As an example, see B. L. Odry, A. P. Kiraly, C. L. Novak, D. P. Naidich, and J. F. Lerallut, "Automated airway evaluation system for multi-slice computed tomography using airway lumen diameter, airway wall thickness and broncho-arterial ratio," SPIE Medical Imaging 2006, vol. 6143, February 2006 and A. P. Kiraly, J. M. Reinhardt, E. A. Hoffman, G. McLennan, and W. E. Higgins, "Virtual Bronchoscopy for Quantitative Airway Analysis," SPIE Medical Imaging 2005: Physiology, Function, and Structure from Medical Images, A. Amini and A. Manduca, eds., SPIE Proceedings vol. 5746, February 2005. The analyses are best conducted on two-dimensional (2D) cross-sections perpendicular to the airways' long axis. These types of cross-sections are often unavailable to the radiologist or technician and, as a result, measurements are often performed only if the airway is aligned with the axial plane. Even in the case where only qualitative evaluation is performed (e.g., airway is normal/abnormal), a perpendicular 2D cross-section is still desired.

Some methods can automatically generate an appropriate cross-section using orientations supplied by a centerline from a bronchial tree model. In turn, the model is obtained from a manual, semi-automatic or fully automatic extraction of the bronchial tree. As an example, see A. P. Kiraly and W. E. Higgins, "Three-dimensional path planning for virtual bronchoscopy," IEEE Trans. Med. Img., vol. 23, no. 11, pp. 1353-1364, November 2004 and A. P. Kiraly, W. E. Higgins, G. McLennan, E. A. Hoffman, and J. Reinhardt, "3D human airway segmentation methods for clinical virtual bronchoscopy," Journal of Academic Radiology, vol. 9, no. 10, pp. 1153-1168, October 2002.

However, it is often the case that such segmentations of the bronchial tree are time-consuming (e.g., in the case of manual and semi-automatic) and/or do not reach distal airway branches. The result will generally be an inability to visualize and measure some branches of the airway tree. Although it may be possible to specify the orientation manually, it would add to the already strained workload of the radiologist/technician and create more user variability in measurements. Accordingly, there is a need for an automated method to obtain the orientation in cases where the tree model is not available.

SUMMARY OF THE INVENTION

An exemplary embodiment of the present invention provides a method that can automatically compute the principle axes of an airway from a three-dimensional (3D) volume, and consequently provide a perpendicular two-dimensional (2D) cross-section for further evaluation or visualization. Using a simple click on any airway, it allows physicians to instantly receive a perpendicularly oriented airway and start their evaluations. It also permits them to make measurements or visualizations of the airways located beyond an automated segmentation. In an alternative embodiment, the user may click on a branch of a vessel tree (e.g., artery or vein) and a parallel 2D cross-section is created.

In an exemplary embodiment of the present invention, there is provided a method including: displaying a 3D image of a lung; receiving a selection of an airway of the lung; and displaying a 2D cross-section image of the airway perpendicular to the airway's long axis, wherein the display of the 2D cross-section image occurs almost immediately after the selection of the airway is received.

After the selection of the airway is received and prior to the display of the 2D cross-section image, the method may further include: creating a volume of interest (VOI) around a point of the 3D image, wherein the point identifies the selected airway; and performing a 3D segmentation of the airway within the VOI.

The 3D segmentation may include adaptive thresholding.

The method may further include determining the long axis of the airway by computing eigenvectors of a Hessian matrix of the segmented VOI around the point.

The method may further include computing a 2D cross-section of the airway perpendicular to the airway's long axis by using interpolation.

The method may further include determining the long axis of the airway by computing eigenvectors of a covariance matrix of the segmented VOI around the point.

The method may further include computing a 2D cross-section of the airway perpendicular to the airway's long axis by using interpolation.

The method may further include qualitatively evaluating the airway in the 2D cross-section image.

The method may further include quantitatively evaluating the airway in the 2D cross-section image.

The airway may be selected from any part of the lung.

The airway may be selected from a part of the lung that is beyond the limit of a segmented bronchial tree of the lung.

The 3D image of the lung may be a Computed Tomography (CT) image.

In an exemplary embodiment of the present invention, there is provided a method including: displaying a 3D image of a lung; receiving a selection of a vessel of the lung; and displaying a 2D cross-section image of the vessel parallel to the vessel's long axis, wherein the display of the 2D cross-section image occurs almost immediately after the selection of the vessel is received.

The vessel may include an artery or a vein.

The vessel may be selected from any part of the lung.

The vessel may be selected from a part of the lung that is beyond the limit of a segmented vessel tree of the lung.

In an exemplary embodiment of the present invention, there is provided a computer program product including: a non-transitory computer readable storage medium having computer readable program code embodied therewith, the computer readable program code comprising: computer readable program code configured to perform the steps of: visualizing a 3D segmented bronchial tree; receiving a user input, wherein the user input corresponds to a click-point that identifies an airway and the click-point is outside of the 3D segmented bronchial tree; computing a 2D cross-section of the airway perpendicular to the airway's long axis; and displaying an image of the 2D cross-section of the airway perpendicular to the airway's long axis.

The display of the 2D cross-section image may occur almost immediately after the selection of the airway is received.

The computer readable program code may be further configured to perform the step of measuring the airway.

The measurements may include the airway's inner diameter or outer diameter.

DETAILED DESCRIPTION OF EXEMPLARY EMBODIMENTS

A method, according to an exemplary embodiment of the present invention, allows a user to select any airway within a three-dimensional (3D) image of the lungs, and to visualize and/or measure it without the need of a pre-computed bronchial tree or segmentation.

As mentioned in the Background section, airway evaluation and measurement is traditionally done on a two-dimensional (2D) cross-section of the airway branch. In the traditional method, the direction of the airway segment is given by the skeleton, which stores the airway centerline as well as the direction next to the centerline site. However, it can occur that the skeleton is not available, or that the targeted airway branch is not contained in the available skeleton. In these cases, no direction is available, nor is the centerline site.

Figure 1A:
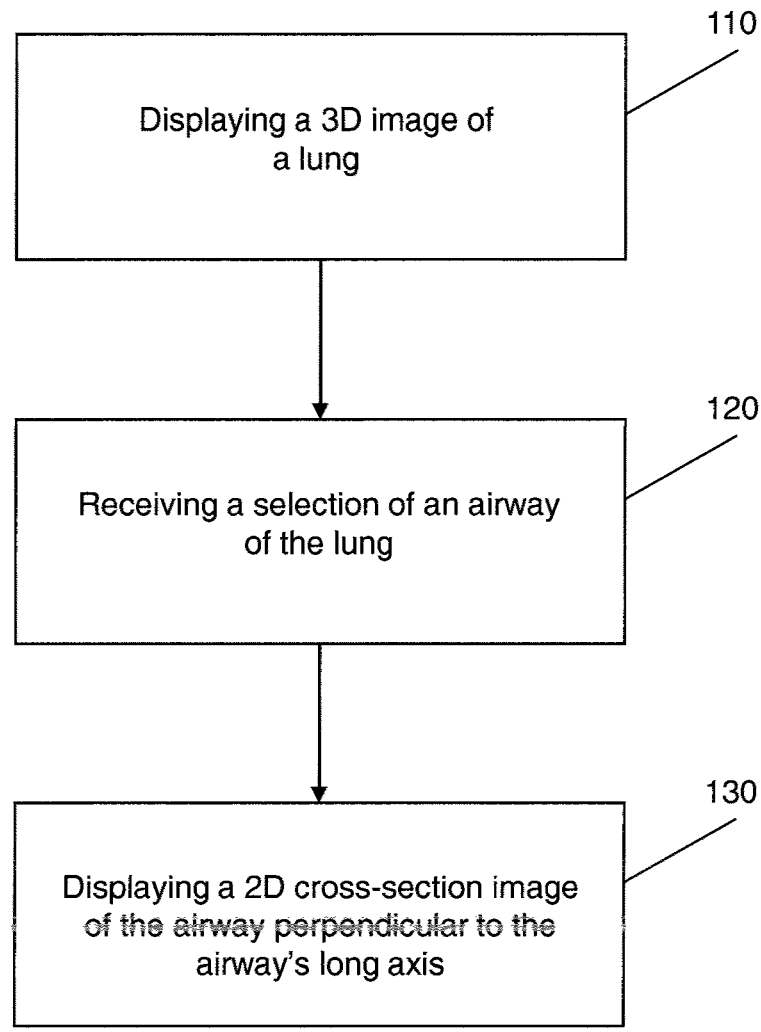
FIG. 1A illustrates a method according to an exemplary embodiment of the present invention.

FIG. 1A, illustrates a method according to an exemplary embodiment of the present invention. As shown in FIG. 1A, a 3D image of a lung is displayed (110). The 3D image may be a Computed Tomography (CT) image or other medical image type. The 3D image may be displayed on a computer screen. Further, the 3D image may include a segmented bronchial tree. In another embodiment, the 3D image may include a segmented vessel tree.

A user may select any airway in the 3D image of the lung (120). This selection may be done for visualization and quantification of the airway. The airway may be selected from anywhere in the 3D image of the lung. For example, the selected airway may be identified by a click-point outside the segmented bronchial tree.

Figure 1B:
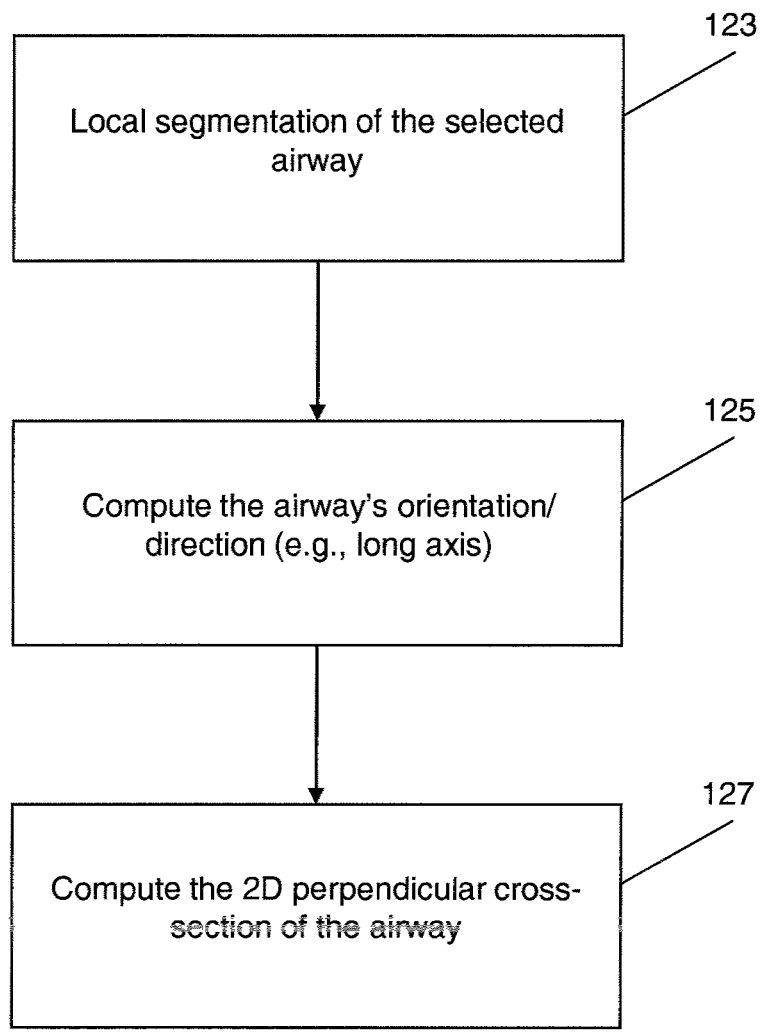
FIG. 1B illustrates part of the method of FIG. 1.

Referring now to FIG. 1B, the selected airway (of 120) is automatically segmented locally (123), its orientation/direction (e.g., long axis) is automatically computed (125) and a 2D cross-section of the airway perpendicular to the airway's long axis is automatically computed (127).

Regarding 123, within a volume of interest (VOI) around, for example the user-selected click-point, a local 3D segmentation of the airway segment (e.g., the airway part in the VOI) is performed using adaptive thresholding. Here, two minimum and maximum threshold values $t_{low}$, $t_{high}$ are defined based on the neighborhood of the clicked location, and a maximum-size limit for the local segmentation is set based on the VOI. A threshold t is iteratively increased from $t_{low}$ to $t_{high}$ and the size of the grown region is monitored against the size limit.

The thresholds, $t_{low}$ and $t_{high}$ are chosen according to whether the object of interest is an airway or vessel. Airways are filled with air, so the thresholds may be chosen to represent the lowest and highest plausible Hounsfield values corresponding to air. Vessels are filled with blood, so the thresholds may be chosen to correspond to the lowest and highest plausible Hounsfield values corresponding to blood.

For example, the maximum size limit may be set to 500 $mm^3$ for a volume of interest of 32,700 $mm^3$. This low limit is to prevent the segmentation from expanding into any bifurcations, which would affect the computation of the orientation. An additional step can be added to locally thin the segmentation of the airway and ensure that only one branch is segmented out.

Regarding 125, the long axis of the airway segment is determined by computing the eigenvectors of the Hessian matrix of the segmented image around the click-point. The Hessian matrix can be expressed as:

$$H(f) = \begin{bmatrix} \frac{\partial^2 f}{\partial x_1^2} & \cdots & \frac{\partial^2 f}{\partial x_1 \partial x_2} & \cdots & \frac{\partial^2 f}{\partial x_1 \partial x_n} \\ \frac{\partial^2 f}{\partial x_2 \partial x_1} & \cdots & \frac{\partial^2 f}{\partial x_2^2} & \cdots & \frac{\partial^2 f}{\partial x_2 \partial x_n} \\ \frac{\partial^2 f}{\partial x_n \partial x_1} & \cdots & \frac{\partial^2 f}{\partial x_n \partial x_2} & \cdots & \frac{\partial^2 f}{\partial x_n^2} \end{bmatrix}$$

The covariance matrix of the segmented airway branch (i.e., the local 3D segmentation of the airway branch that was selected/clicked-on) can also be used to determine the eigenvectors. The orientation/direction of the airway segment is given by the long axis of the matrix. For example, the long axis of the airway segment corresponds to the largest eigenvalue.

Figure 2:
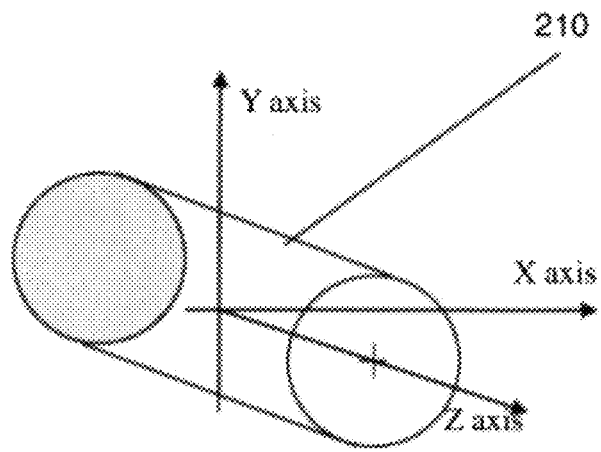
FIG. 2 illustrates an airway segment with its principle axes that have been determined in a method according to an exemplary embodiment of the present invention.

FIG. 2 illustrates an airway segment 210 (e.g., a hollow tube), showing the principle axes (e.g., X axis, Y axis and Z axis) thereof that have been determined by computing the eigenvectors as described above.

Figure 3:
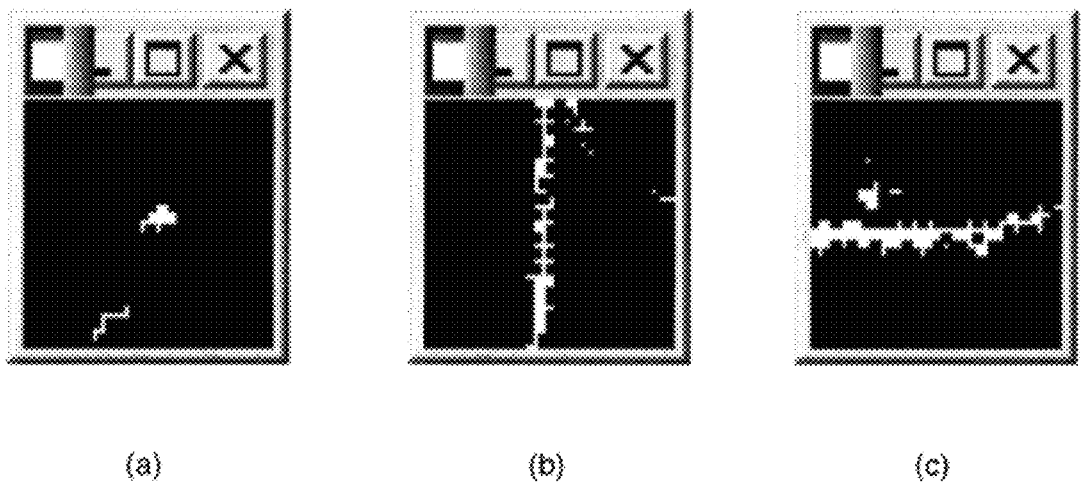
FIG. 3 illustrates a projection on an airway segment along each of its principle axes, the projection computed according to an exemplary embodiment of the present invention.

FIG. 3 illustrates a projection of an airway along each of the computed principle axes Z (FIG. 3 (*a*)), X (FIG. 3 (*b*)), and Y (FIG. 3 (*c*)). In FIG. 3 (*a*), the projection only shows a focal point indicating that the Z axis follows the airway orientation/direction. Here, the corresponding eigenvalue of the Z axis was the largest. In other words, FIG. 3 (*a*) confirms that the Z axis in FIG. 2 is the long axis. In FIGS. 3 (*b*) and (*c*), the projections are vertical and horizontal respectively, showing the accuracy of the orientation.

Regarding 127, once the principal axes of the airway have been determined, it is straightforward to compute the 2D perpendicular cross-section of the airway by using, for example, trilinear interpolation or other forms of interpolations such as tri-cubic or nearest neighbor. The 2D perpendicular cross-section of the airway is a plane that cuts the airway along the X and Y axes.

In the case where a physician wants to visualize or analyze a segment of a vessel tree, sometimes a plane parallel to the blood vessel is desired, so that stenoses can be more accurately evaluated, for example. In this case, the 2D cross-section of the vessel could be computed to lie along (e.g., parallel) the long axis rather than perpendicular to it.

Referring back to FIG. 1A, an image of the 2D cross-section of the airway that is perpendicular to the airway's long axis is displayed (130).

Figure 4:
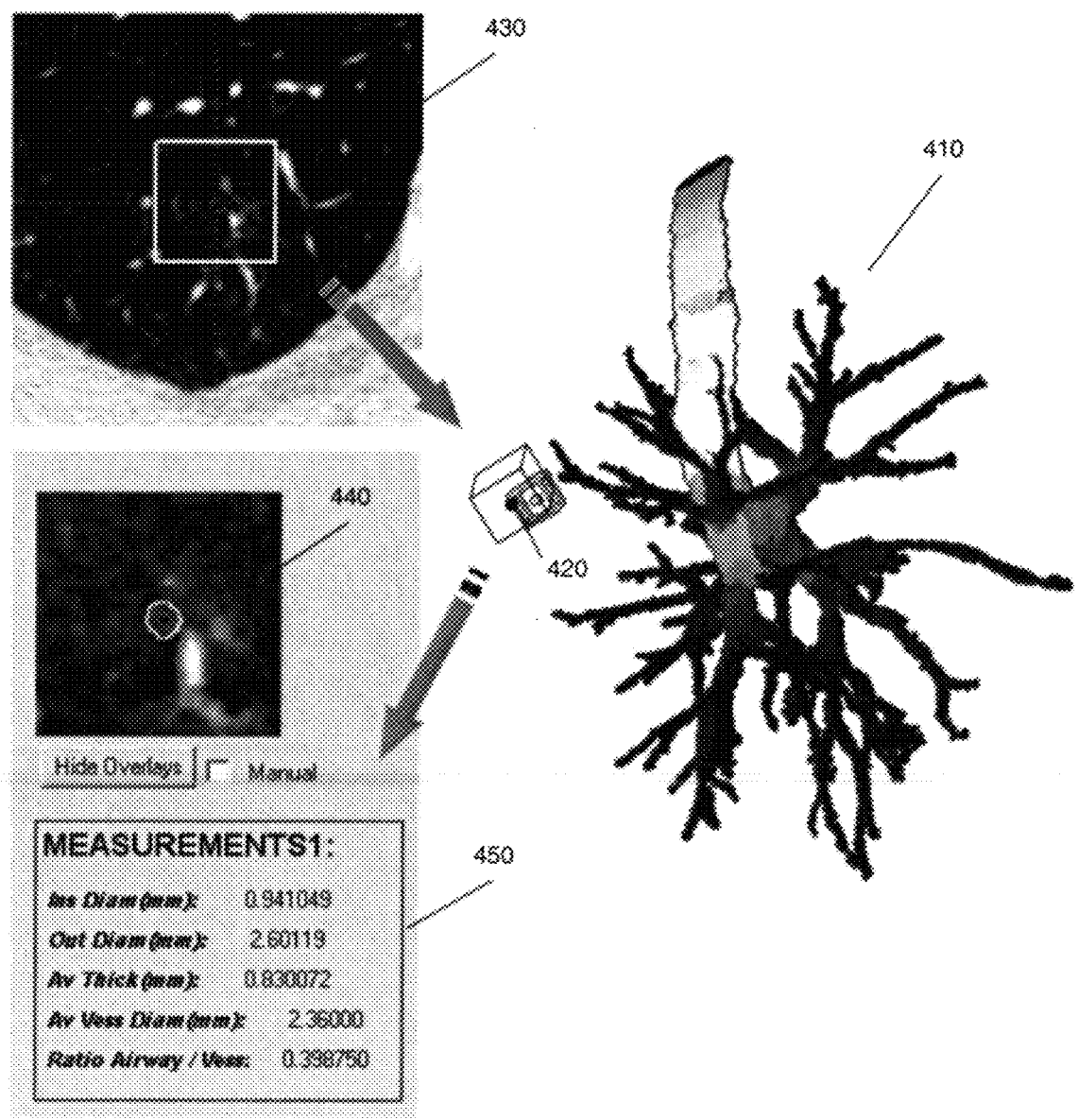
FIG. 4 illustrates a workflow according to an exemplary embodiment of the present invention.

FIG. 4 illustrates an example of a workflow according to an exemplary embodiment of the present invention. FIG. 4 includes a segmented bronchial tree 410, a selected airway 420 and a 3D image of a lung 430 the segmented bronchial tree 410 was derived from. In FIG. 4, a user may select the airway 420 from image 430 (the click-point corresponding to airway 420 is shown in the center of the solid box in the center of image 430). As can be seen in FIG. 4, the selected airway 420 is beyond the limit of the segmented bronchial tree 410, but analysis can proceed anyway since the method of FIG. 1A is running in the background, for example. Almost immediately after the user selects the airway 420, image 440 in the lower left of FIG. 4 appears.

Image 440 is a 2D cross-section image of the airway 420 perpendicular to the airway's 420 local orientation. In image 440, tubular shapes appear as a ring with an outer wall and an inner wall. The tubular shapes correspond to the airway 420. As can be seen, the user can visualize the selected airway's 2D cross-section and evaluate it qualitatively. For example, the airway's 2D cross-section can be compared visually to a nearby artery (e.g., the bright oval shape to the lower right of the ring in image 440).

The user can also use the 2D cross-section image to make quantitative measurements, using electronic calipers or line drawing tools. Automated quantification methods can also be applied on the 2D cross-section of the airway to determine airway dimensions. Examples of automated measurements are shown by 450 in FIG. 4.

The above described method allows a clinician or operator to easily obtain the cross-section of a vessel or airway with a single click. The above described method opens the possibility to explore airways that are not perpendicular to the axial plane. In addition, it allows one to explore vessels and airways that may not be included in an automated segmentation of a bronchial or vessel tree.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article or manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
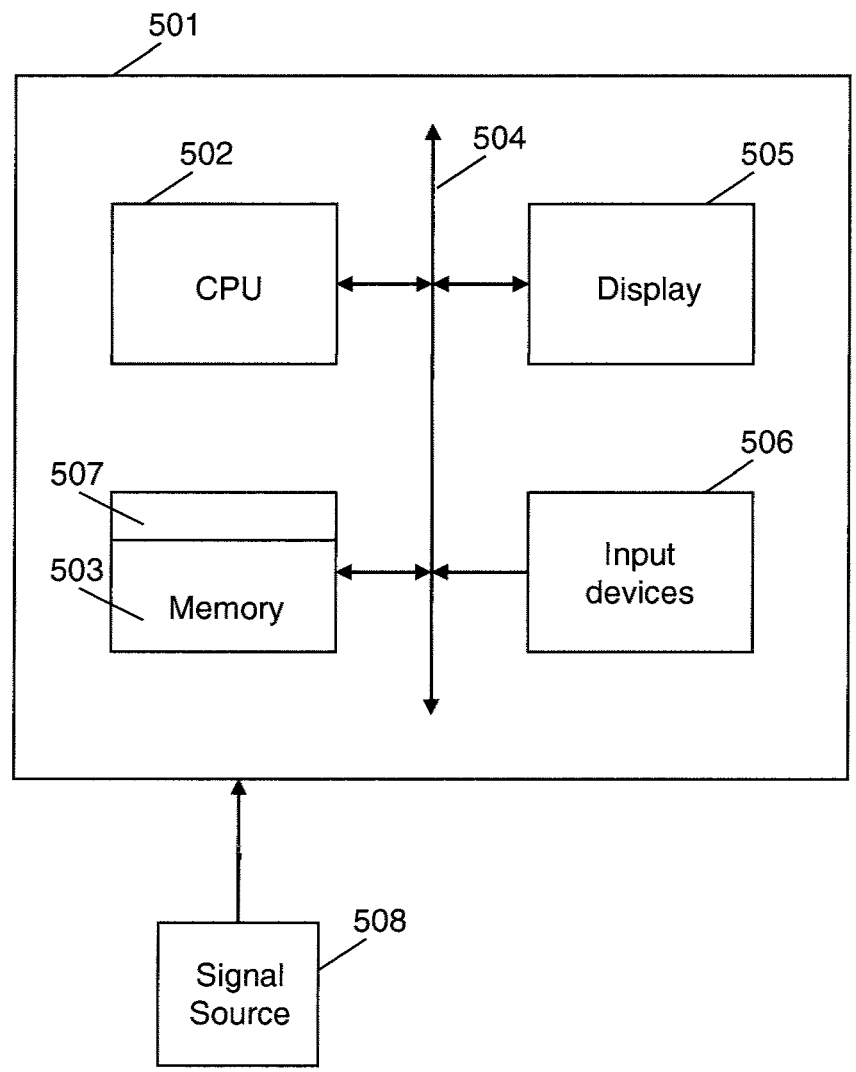
FIG. 5 illustrates a system in which an exemplary embodiment of the present invention may be implemented.

Referring now to FIG. 5, according to an exemplary embodiment of the present invention, a computer system 501 can comprise, inter alia, a central processing unit (CPU) 502, a memory 503 and an input/output (I/O) interface 504. The computer system 501 is generally coupled through the I/O interface 504 to a display 505 and various input devices 506 such as a mouse and keyboard. The support circuits can include circuits such as cache, power supplies, clock circuits, and a communications bus. The memory 503 can include RAM, ROM, disk drive, tape drive, etc., or a combination thereof. Exemplary embodiments of present invention may be implemented as a routine 507 stored in memory 503 (e.g., a non-transitory computer-readable storage medium) and executed by the CPU 502 to process the signal from a signal source 508. As such, the computer system 501 is a general-purpose computer system that becomes a specific purpose computer system when executing the routine 507 of the present invention.

The computer system 501 also includes an operating system and micro-instruction code. The various processes and functions described herein may either be part of the micro-instruction code or part of the application program (or a combination thereof) which is executed via the operating system. In addition, various other peripheral devices may be connected to the computer system 501 such as an additional data storage device and a printing device.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical functions(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

What is claimed is:

1. A method, comprising:
   displaying a three-dimensional (3D) image of a lung, wherein the 3D image includes a segmented bronchial tree;
   receiving a selection of an airway of the lung, wherein the selected airway is identified by a click-point outside the segmented bronchial tree;
   locally segmenting the selected airway, determining its orientation/direction and computing a two-dimensional (2D) cross-section of the airway perpendicular to the airways's long axis; and
   displaying a (2D) cross-section image of the airway perpendicular to the airway's long axis, wherein the display of the 2D cross-section image occurs immediately after the selection of the airway is received,
   wherein the selected airway is locally segmented by:
   creating a volume of interest (VOI) around a point of the 3D image, wherein the point identifies the selected airway;
   performing a 3D segmentation of the airway within the VOI, wherein the 3D segmentation of the airway includes minimum and maximum thresholds based on a neighborhood of the click-point, wherein the minimum threshold is set to prevent the 3D segmentation from expanding into a bifurcation and the maximum threshold is a Hounsfield value corresponding to air; and
   locally thinning the 3D segmentation of the airway to ensure that only one branch is segmented.

2. The method of claim 1, wherein the long axis of the airway is determined by computing eigenvectors of a Hessian matrix of the segmented VOI around the point.

3. The method of claim 2, wherein the 2D cross-section of the airway perpendicular to the airway's long axis is computed by using interpolation.

4. The method of claim 1, wherein the long axis of the airway is determined by computing eigenvectors of a covariance matrix of the segmented VOI around the point.

5. The method of claim 4, wherein the 2D cross-section of the airway perpendicular to the airway's long axis is computed by using interpolation.

6. The method of claim 1, further comprising qualitatively evaluating the airway in the 2D cross-section image.

7. The method of claim 1, further comprising quantitatively evaluating the airway in the 2D cross-section image.

8. The method of claim 1, wherein the 3D image of the lung is a Computed Tomography (CT) image.

9. A method, comprising:
   displaying a three-dimensional (3D) image of a lung, wherein the 3D image includes a segmented vessel tree;
   receiving a selection of a vessel of the lung, wherein the selected vessel is identified by a click-point outside the segmented vessel tree;

locally segmenting the selected vessel, determining its orientation/direction and computing a two-dimensional (2D) cross-section of the vessel parallel to the vessel'long axis; and displaying a (2D) cross-section image of the vessel parallel to the vessel's long axis, wherein the display of the 2D cross-section image occurs immediately after the selection of the vessel is received.

wherein the selected vessel is locally segmented by:

creating a volume of interest (VOI) around a point of the 3D image, wherein the point identifies the selected vessel;

performing a 3D segmentation of the vessel within the VOI, wherein the 3D segmentation of the vessel includes minimum and maximum thresholds based on a neighborhood of the click-point, wherein the minimum threshold is set to prevent the 3D segmentation from expanding into a bifurcation and maximum threshold is a Hounsfield value corresponding to blood; and locally thinning the 3D segmentation of the vessel to ensure that only one branch is segmented.

10. The method of claim 9, wherein the vessel includes an artery or a vein.

11. A computer program product, comprising:

a non-transitory computer readable storage medium having computer readable program code embodied therewith, the computer readable program code comprising:

computer readable program code configured to perform the steps of:

visualizing a three-dimensional (3D) segmented bronchial tree;

receiving a user input, wherein the user input corresponds to a click-point that identifies an airway and the click-point is outside of the 3D segmented bronchial tree;

locally segmenting the selected airway and determining its orientation/direction;

computing a two-dimensional (2D) cross-section of the airway perpendicular to the airway's long axis; and displaying an image of the 2D cross-section of the airway perpendicular to the airway's long axis, wherein the selected airway is locally segmented by:

creating a volume of interest (VOI) around a point of the 3D segmented bronchial tree, wherein the point identifies the selected airway;

performing a 3D segmentation of the airway within the VOI, wherein the 3D segmentation of the airway includes minimum and maximum thresholds based on a neighborhood of the click-point, wherein the minimum threshold is set to prevent the 3D segmentation from expanding into a bifurcation and the maximum threshold is a Hounsfield value corresponding to air; and locally thinning the 3D segmentation of the airway to ensure that only one branch is segmented.

12. The computer program product of claim 11, wherein the display of the 2D cross-section image occurs immediately after the selection of the airway is received.

13. The computer program product of claim 11, wherein the computer readable program code is further configured to perform the step of measuring the airway.

14. The computer program product of claim 13, wherein the measurements include the airway's inner diameter or outer diameter.

\* \* \* \* \*